Reissued Nov. 21, 1939 Re. 21,268

UNITED STATES PATENT OFFICE 21,268

PHOTOGRAPHIC BACKING PAPER

Ernest Loring Baxter, Rochester, N. Y., assignor to Eastman Kodak Company, Rochester, N. Y., a corporation of New Jersey No Drawing. Original No. 2,153,130, dated April 4, 1939, Serial No. 167,015, October 2, 1937. Application for reissue September 30, 1939, Serial No. 297,361

8 Claims. (Cl. 95—9)

This invention relates to an improved photographic backing paper and to a photographic cartridge including such backing paper.

The principal object of the invention is to provide such a backing paper and cartridge in which the ink used to form the indicia thereon has certain properties of particular utility and advantages of this particular purpose.

Such indicia are preferably printed by the rotogravure process and an ink suitable for use in that process is, therefore, desirable.

A perfect rotogravure ink should be of low viscosity and have low surface tension; it should show good cohesion and poor adhesion; it should dry to a hard condition so that it will not smudge; and the solvents which it contains should be of high volatility, low flammability and low toxicity. Hitherto it has been impossible to fulfill all of these conditions in the same ink. Most rotogravure inks have been "spirit" inks; that is, inks made with highly volatile organic solvents. These solvents are highly flammable and many of them are toxic. Inks in which water is used as the solvent have had high surface tension, and have given proofs of the poorest quality.

Inks for printing photographic backing paper, such as for printing the white or black numerals, etc., on the green or red backing paper which protects photographic roll film, have been of two types: water inks and spirit inks. Water inks are composed of a water-soluble dye (or a pigment), a water-soluble binder, such as gelatin, agar-agar, or casein, and water. Spirit inks are composed of a spirit-soluble dye (or a pigment), a spirit-soluble binder, such as a resin, and an organic solvent. As has been shown in U. S. Patent 807,458, it is desirable that the backing paper be printed with ink having the same hygroscopic qualities as the surface of the paper; otherwise, under some conditions of storage, particularly under tropical conditions, the numerals reproduce themselves photographically on the sensitized emulsion of the film. The paper is usually coated or sized, after printing, with an aqueous solution of gelatin, agar-agar, casein, etc. When the printing resulting from a water-soluble ink is coated with such an aqueous solution, smearing of the printing often takes place. In the same way, the printing resulting from spirit-soluble inks smears if the paper is overcoated with a spirit-soluble coating. A water ink cannot be used with a spirit-soluble overcoating, or a spirit ink with a water-soluble overcoating, because of the resultant difference in hygroscopicity. It has not hitherto been possible to use the rotogravure process for printing the numerals, etc., on photographic backing paper. The resins used in rotogravure inks are moisture-resistant, and many of them are photographically active, causing fogging of the photographic emulsion on the film with which the paper is used. Water inks, such as those described in U. S. Patent 807,458, will not print by the rotogravure process.

I have discovered that zein and the other prolamines, such as gliadin and hordin, which are soluble in aqueous alcohol, are excellent binders for rotogravure inks, and that such inks are very satisfactory for printing photographic backing papers. The prolamines are insoluble in water alone and in organic solvents alone; hence printing resulting from an ink in which a prolamine is the binder does not smear when coated with either an aqueous solution or a spirit solution. The prolamines are water-susceptible, however, being swelled by moisture in a manner similar to gelatin or casein. Therefore, photographic paper can be printed with an ink in which the binder is zein or another prolamine, and then coated with an aqueous solution of gelatin or casein, etc. The printing will not smear, and will have the same hygroscopic qualities as the overcoating. Moreover, the prolamines are not photographically active, so that they do not fog or desensitize the emulsion on photographic film with which the paper may be rolled up.

My novel inks containing a prolamine as a binder fulfill the requirements of a perfect rotogravure ink as well as do ordinary rotogravure inks, and in addition the flammability and toxicity of the solvent are much less than those of the solvents ordinarily used in rotogravure inks. In addition, the use of water as part of the solvent reduces the cost of the ink.

Among the alcohols and other organic solvents which may be used with water to dissolve zein or other prolamines are:

Ethyl alcohol
n-Propyl alcohol
n-Butyl alcohol
Secondary-butyl alcohol
Tertiary-butyl alcohol
Lactic acid
Acetic acid
Ethyl lactate
Monoethyl ether of ethylene glycol
Monomethyl ether of ethylene glycol
Acetone
Propylene glycol Mixtures of these solvents may also be used, with water.

A suitable rotogravure ink containing zein or other prolamine as a binder may have the following general formula:

| | | |
|---|---|---|
| Organic solvent(s) | parts | 50 to 90 |
| Water | do | 50 to 10 |
| Dye | parts or more | 2 to 5 |
| Zein or other prolamine | do | 3 to 30 |

The dye may be any dye that is soluble in the solvent-water mixture and is not photographically active, such, for instance, as:

Spirit Nigrosin N. B.
Nigrosin Spirit Jet
Sudan Black B
Japan Black MGB
Zapon Fast Black M
Luxol Fast Blue In place of a dye, a pigment, such, for instance, as titanium oxide or carbon black may be used in suitable amount. In inks for printing photographic backing paper, I prefer to use Spirit Nigrosin N. B. for black ink, and titanium oxide for white ink.

I give below, by way of examples, a number of formulae for inks which I have found satisfactory. The printing and drying characteristics may be controlled by the concentration of zein and by selecting a solvent of the proper boiling point.

*Example I*

| | | |
|---|---|---|
| Ethyl alcohol | cc | 75 |
| Monomethyl ether of ethylene glycol | cc | 75 |
| Zein | grams | 20 |
| Water | cc | 50 |
| Nigrosin N. B | grams | 10 |

*Example II*

| | | |
|---|---|---|
| Monomethyl ether of ethylene glycol | cc | 160 |
| Zein | grams | 20 |
| Water | cc | 40 |
| Titanium oxide | grams | 80 |

*Example III*

| | | |
|---|---|---|
| Ethyl alcohol | cc | 300 |
| n-Butyl alcohol | cc | 100 |
| Zein | grams | 60 |
| Water | cc | 80 |
| Nigrosin N. B | grams | 16 |

*Example IV*

| | | |
|---|---|---|
| Ethyl alcohol | cc | 320 |
| Zein | grams | 8 |
| Water | cc | 80 |
| Nigrosin N. B | grams | 8 |

*Example V*

| | | |
|---|---|---|
| Ethyl alcohol | cc | 150 |
| Monomethyl ether of ethylene glycol | cc | 150 |
| Zein | grams | 40 |
| Water | cc | 50 |
| Nigrosin N. B | grams | 10 |

*Example VI*

| | | |
|---|---|---|
| Ethyl alcohol | cc | 100 |
| Monomethyl ether of ethylene glycol | cc | 180 |
| Zein | grams | 20 |
| Water | cc | 40 |
| Nigrosin N. B | grams | 10 |

*Example VII*

| | | |
|---|---|---|
| Monomethyl ether of ethylene glycol | cc | 400 |
| Zein | grams | 50 |
| Water | cc | 100 |
| Titanium oxide | grams | 200 |

*Example VIII*

| | | |
|---|---|---|
| Ethyl alcohol | cc | 400 |
| Zein | grams | 50 |
| Water | cc | 100 |
| Titanium oxide | grams | 300 |

What I claim as my invention and desire to be secured by Letters Patent of the United States is:

1. Photographic backing paper carrying indicia composed of a non-hardened prolamine and coloring matter, overcoated with a colloid.

2. Photographic backing paper carrying indicia composed of non-hardened zein and coloring matter, overcoated with a colloid.

3. An unsensitized, opaque, photographic backing paper carrying on one surface indicia composed of a non-hardened prolamine and coloring matter, and overcoated with a colloid, such paper having the property that, when the indicia-bearing surface is maintained in contact with a photographically sensitive emulsion, the indicia will not affect the emulsion.

4. A roll film cartridge comprising inter-rolled strips of film having a sensitized layer and of unsensitized backing paper, that surface of the backing paper which is in contact with the sensitized layer carrying indicia composed of a non-hardened prolamine and coloring matter and being overcoated with a colloid.

5. Photographic backing paper carrying indicia composed of a non-hardened prolamine and coloring matter, overcoated with a water-soluble colloid.

6. Photographic backing paper carrying indicia composed of non-hardened zein and coloring matter, overcoated with a water-soluble colloid.

7. An unsensitized, opaque, photographic backing paper carrying on one surface indicia composed of a non-hardened prolamine and coloring matter, and overcoated with a water-soluble colloid, such paper having the property that, when the indicia-bearing suface is maintained in contact with a photogaphically sensitive emulsion, the indicia will not affect the emulsion.

8. A roll film cartridge comprising inter-rolled strips of film having a sensitized layer and of unsensitized backing paper, that surface of the backing paper which is in contact with the sensitized layer carrying indicia composed of a non-hardened prolamine and coloring matter and being overcoated with a water-soluble colloid.

ERNEST LORING BAXTER.